US011834016B2

(12) United States Patent
Biguinet (10) Patent No.: US 11,834,016 B2
(45) Date of Patent: Dec. 5, 2023

(54) MODULAR HYDRAULIC BRAKE ACTUATION ASSEMBLY

(71) Applicant: Robert Bosch GmbH, Stuttgart (DE)

(72) Inventor: Benoit Biguinet, Lyons (FR)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 17/379,701

(22) Filed: Jul. 19, 2021

(65) Prior Publication Data

US 2022/0032890 A1 Feb. 3, 2022

(30) Foreign Application Priority Data

Jul. 28, 2020 (EP) .................................... 20188018

(51) Int. Cl.
*B60T 13/62* (2006.01)
*B60T 7/04* (2006.01)
*B60T 13/68* (2006.01)

(52) U.S. Cl.
CPC .............. *B60T 13/62* (2013.01); *B60T 7/042* (2013.01); *B60T 13/686* (2013.01);
(Continued)

(58) Field of Classification Search
CPC ... B60T 7/04; B60T 7/042; B60T 8/26; B60T 8/4809; B60T 11/203; B60T 13/62;
(Continued)

(56) References Cited

U.S. PATENT DOCUMENTS 3,729,235 A * 4/1973 Bach ....................... B60T 8/447
60/555
3,910,643 A * 10/1975 Kobashi ................ B60T 8/3635
303/114.2

(Continued)

OTHER PUBLICATIONS

"Pedal Assembly Modulating Valves Service Instructions," MICO, Inc., WABCO, Jan. 2010 (2 pages).

*Primary Examiner* — Robert A. Siconolfi
*Assistant Examiner* — San M Aung
(74) *Attorney, Agent, or Firm* — Maginot, Moore & Beck LLP (57) ABSTRACT

A hydraulic brake actuation assembly with a first and a second spool is disclosed. The hydraulic brake actuation assembly includes a first and a second subassembly which are configured to be mounted to each other in a pre-assembled manner. The first subassembly includes the first spool and a first actuation piston which are moveable along a first axis respectively. At least one first spring is located between the first spool and the first actuation piston along the first axis. The first subassembly includes the second spool and a second actuation piston which are moveable along a second axis respectively. At least one second spring is located between the second spool and the second actuation piston along the second axis. The first and the second axis are parallel to each other. The second subassembly includes a third and a fourth actuation piston. The third actuation piston is moveable along the first axis. It has a third contact surface which is able to contact a first contact surface of the first actuation piston. The fourth actuation piston is moveable along the second axis. It has a fourth contact surface which is able to contact a second contact surface of the second actuation piston.

11 Claims, 6 Drawing Sheets

(52) U.S. Cl.
CPC ... *B60T 2270/402* (2013.01); *B60T 2270/404* (2013.01); *B60T 2270/82* (2013.01)

(58) Field of Classification Search
CPC .. B60T 13/686; B60T 13/141; B60T 2270/82; B60T 2270/402; B60T 2270/404
USPC .......................................................... 303/2
See application file for complete search history.

(56) References Cited

U.S. PATENT DOCUMENTS

| | | | |
|---|---|---|---|
| 10,625,726 B2* | 4/2020 | Johnson | B60T 13/686 |
| 2011/0185723 A1* | 8/2011 | Ganzel | B60T 7/042 |
| | | | 60/547.1 |
| 2012/0062022 A1* | 3/2012 | Heren | B60T 11/21 |
| | | | 303/2 |

* cited by examiner

MODULAR HYDRAULIC BRAKE ACTUATION ASSEMBLY

This application claims priority under 35 U.S.C. § 119 to European patent application no. EP 20188018.4, filed on Jul. 28, 2020 in Europe, the disclosure of which is incorporated herein by reference in its entirety.

The disclosure relates to a hydraulic brake actuation assembly.

BACKGROUND

U.S. Pat. No. 10,625,726 B2 shows a hydraulic brake actuation assembly with a first and a second spool to have two independent brake circuits. The spools may be directly operated in parallel by one foot pedal in a purely mechanical way. Furthermore they may by operated electro-hydraulically.

The data sheet which was available on 14.07.2020 under the internet link https://www.mico.com/sites/default/files/documentpdfs/81460209Pedal%20Assembly%20Modulating%20Valves_0.pdf shows a hydraulic brake actuation assembly with two spools which are operated by a single foot pedal in parallel in a purely mechanical way.

The aim of the disclosure is to provide a great variety of hydraulic brake actuation assemblies, which are different in the way of operation. Each individual hydraulic brake assembly should be cost effective. Especially the following variants should be provided:
  purely mechanical operation,
  purely electro-hydraulic operation with one or two control valves, and
  mechanical operation and electrohydraulic operation with one or two control valve.

If mechanical operation is present, operation by foot or by hand should be possible. It is clear that a number of further variants exist. With the conventional design each variant is different, wherein only very few common parts are present. With the inventive design the first subassembly, which is the most complex part, is the same for all variants of the hydraulic brake assembly. It can be produced in high numbers in a cost effective way. The second subassembly has lots of different variants. But because of its simplicity it is easy and cost effective to manufacture.

SUMMARY

According to disclosure, the hydraulic brake actuation assembly comprises a first and a second subassembly, which are configured to be mounted to each other in a preassembled manner, wherein the first subassembly comprises the first spool and a first actuation piston which are moveable along a first axis respectively, wherein at least one first spring is located between the first spool and the first actuation piston along the first axis, wherein the first subassembly comprises the second spool and a second actuation piston which are moveable along a second axis respectively, wherein at least one second spring is located between the second spool and the second actuation piston along the second axis, wherein the first and the second axis are parallel to each other, wherein the second subassembly comprises a third and a fourth actuation piston, wherein the third actuation piston is moveable along the first axis, wherein it has a third contact surface, which is able to contact a first contact surface of the first actuation piston, wherein the fourth actuation piston is moveable along the second axis, wherein it has a fourth contact surface which is able to contact a second contact surface of the second actuation piston.

Preferably the first and the second subassembly are fully preassembled before they are mounted together. Preferably there is at least one means of actuation which acts on the third and/or the fourth actuation piston, to operate the brake. Preferably the first and the second actuation piston are only operated via the third or the fourth actuation piston respectively. Preferably the first to fourth contact surfaces are flat and perpendicular to the first and the second axis respectively. Preferably an outer diameter of the first actuation piston at the first contact surface is larger than an outer diameter of the first spool. Preferably an outer diameter of the second actuation piston is larger than an outer diameter of the second spool. Preferably the first and/or the second spool are a part of a pressure reducing valve respectively.

Further improvements of the disclosure are described below.

It may be provided, that the second subassembly has a second body which accommodates the third and the fourth actuation piston, wherein the second body is fixed to a first body of the first subassembly, wherein the first body accommodates the first and the second spool, the first and the second actuation piston and the at least one first spring and the at least one second spring, wherein a diameter of the third actuation piston at the third contact surface is smaller than a diameter of the first actuation piston at the first contact surface, wherein the second body limits a movement of the first actuation piston along the first axis and/or wherein a diameter of the fourth actuation piston at the fourth contact surface is smaller than a diameter of the second actuation piston at the second contact surface, wherein the second body limits a movement of the second actuation piston along the second axis. With this embodiment the diameter of the first and the fourth actuation piston, can be adapted to the selected way of actuation in a flexible way. The first and the second actuation pistons are identical for all ways of actuation. Furthermore the first subassembly is easy to assemble because of its large recess facing the second subassembly. Preferably the first to fourth actuation piston have a cylindrical portion at the first to fourth contact surface respectively, wherein the cylindrical portion is accommodated in a matched bore of the first or the second body respectively. Preferably the named matched bore for the first and/or second actuation piston surrounds the cylindrical portion partly, e.g. by 75%. With this embodiment the recess described below can be provided. Preferably the first and the second body abut to each other on a flat surface, which is perpendicular to the first and the second axis. Preferably the first and the second body and the first and the second spool delimit an exhaust chamber, which is fluidically connected to an exhaust connection of the first body. The pressure in the exhaust chamber preferably acts on the first and the second actuation pistons from all sides equally, so it does not produce a net force on the first or second actuation piston respectively.

It may be provided, that there is a recess in the first body located between the first and the second actuation piston, wherein the recess is covered by the second body, wherein the recess is arranged in a way to allow leakage from the third and/or the fourth actuation piston to flow into an exhaust chamber of the first body. In the variants of the second subassembly which provide an electro-hydraulic actuation leakage may occur. With the described embodiment this leakage can easily directed to a tank via the exhaust chamber. The exhaust chamber preferably has an exhaust connection, which can be connected to a tank.

It may be provided, that the third actuation piston together with the second body delimits a first chamber, wherein the volume of the first chamber increases when the third actuation piston is moved toward the first spool and/or wherein the fourth actuation piston together with the second body delimits a second chamber, wherein the volume of the second chamber increases when the fourth actuation piston is moved toward the second spool, wherein the second subassembly comprises at least one control valve, which is fluidically connected to the first and/or the second chamber. With this embodiment an electro-mechanical operation of the brakes is provided. It should be noted that the corresponding control pressure does not directly act on the first or second spool as with U.S. Pat. No. 10,625,726 B2. Instead the correspond action is via the at least one first or second spring. This provides a better fine control of the breaking force and avoids oscillations of the brake force. Preferably the at least one control valve is a pressure reducing valve whose output pressure is connected to the first and/or second chamber. Preferably a set pressure of the control valve is electrically adjusted. Preferably if one control valve is present, this control valve is fluidically connected to the first and the second chamber in parallel, such that the first and the second chamber have the same pressure. Preferably if two control valves are present the first and the second chamber are fluidically connected to a separate control valve respectively. With this embodiment it is possible to have an electro-mechanical operated hydraulic brake actuation assembly, wherein a mechanical way to directly operate the spools may be present or not.

It may be provided, that the first and the second spool has a separate pressure source respectively, wherein the at least one control valve is connected to the named at least one pressure source for pressure supply. Preferably there is a shuttle valve, wherein the pressure sources are connected to an input side of the shuttle valve, wherein an output side of the shuttle valve is connected to the at least one control valve. Preferably the shuttle valve is located in the second subassembly. Preferably each pressure source comprises a hydraulic accumulator. If two control valves are present each control valve may be connected to a separate pressure source respectively.

It may be provided, that the hydraulic brake actuation assembly comprises a moveable actuation element configured to operate the first and the second spool in parallel, wherein there is a third subassembly, which is configured to be mounted to the second subassembly in a pre-assembled manner, wherein the third subassembly comprises the actuation element, wherein the actuation element is configured to contact the third and the fourth actuation piston in parallel. With this embodiment a purely mechanical way of actuating the brakes is provided. Preferably the actuation element is a pedal, for operation by a human foot. It is possible to use an actuation element which is configured to be operated by a human hand. The named contact between the actuation element and the third and/or fourth actuation piston may be suspended, while the actuation element is not actuated.

It may be provided, that the third actuation piston has a first actuation section which protrudes out of a second body of the second subassembly in every position of the third actuation piston, wherein the actuation element is able to contact the third actuation piston at the first actuation section and/or wherein the fourth actuation piston has a second actuation section which protrudes out of the second body in every position of the fourth actuation piston, wherein the actuation element is able to contact the fourth actuation piston at the second actuation section. This embodiment results in a simple configuration of the third subassembly, especially when the rocker described below is used.

It may be provided, that the third subassembly has a third body which is fixed to the second body, wherein the actuation element is movably mounted to the third body, wherein a rocker is mounted pivotably to the remaining actuation element with respect to a third axis, wherein the rocker has a first and a second free end, which are located on opposite sides of the third axis, wherein the first free end is able to contact the first actuation section, wherein the second free end is able to contact the second actuation section. With this embodiment the force from the actuation element can equally distributed to the first and the second spool. When one of the spools block due to a failure, the other spool remains functional. Preferably the second and the third body abut to each other on a flat surface, which is perpendicular to the first and the second axis.

It may be provided, that the actuation element is a pedal, which is pivotably mounted to the third body with respect to a fourth axis, wherein the fourth axis is perpendicular to the first and the second axis, wherein the distance from the fourth to the first axis and from the fourth to the second axis is the same. Preferably there is a sensor, which is configured to measure the pivot angle of the pedal with respect to the fourth axis. Preferably the sensor makes use of the Hall effect. Preferably the third axis is perpendicular to the fourth axis, wherein it is located between the first and the second axis.

It may be provided, that the first actuation section penetrates through the first chamber and/or wherein the second actuation section penetrates through the second chamber. This results in a simple and cost effective third and/or fourth actuation piston.

Also disclosed is a collection that includes at least two hydraulic brake actuation assemblies, which are configured according to the disclosure respectively, wherein all first subassemblies of the collection are identical, wherein the second subassemblies of the collection are different from each other. It is possible the have no and/or different or identical third subassemblies within the collection, for example different third subassemblies for foot and hand operation.

It goes without saying that the features mentioned above and those which are still to be explained below can be used not only in the particular combination indicated but also in other combinations or in independent form without departing from the scope of the present disclosure.

BRIEF DESCRIPTION OF THE DRAWINGS

The disclosure is explained in more detail below with reference to the accompanying drawings. It shows.

DETAILED DESCRIPTION

Figure 1:
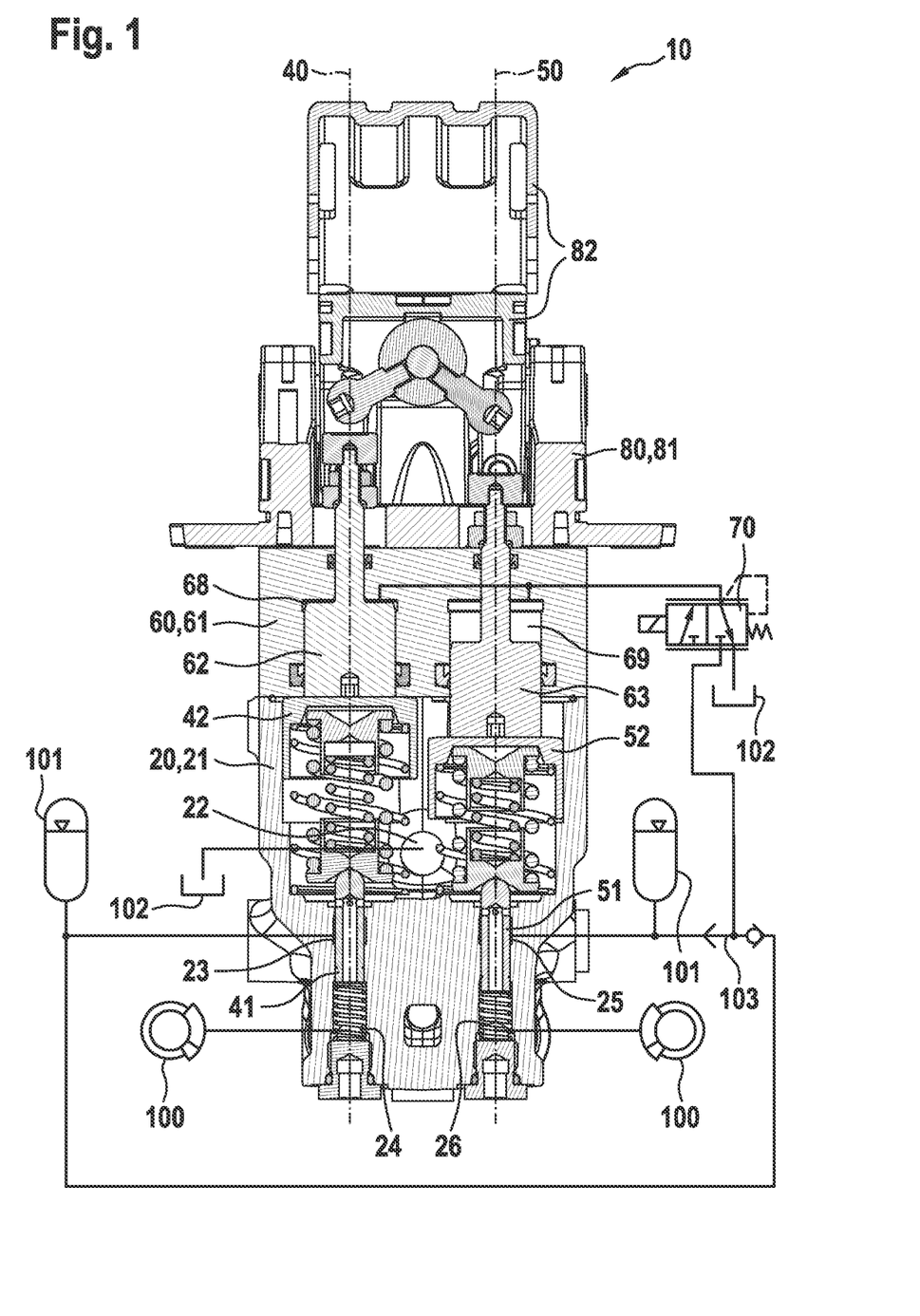
FIG. 1 a sectional view of a hydraulic brake assembly according to a first embodiment of the disclosure.

FIG. 1 shows a sectional view of a hydraulic brake assembly 10 according to a first embodiment of the disclosure. The hydraulic brake assembly 10 comprises a first, a second and a third subassembly 20; 60; 80. Each subassembly 20; 60; 80 can be preassembled completely. Afterwards the whole hydraulic brake assembly is assembled from the named three subassemblies 20; 60; 80. The named subassemblies 20; 60; 80 are preferably fixed to each other via screws. Especially the third subassembly 60 exists in different variants, wherein FIG. 1 shows one of the more sophisticated variants of the second subassembly 60 which allows a purely manual operation of the brakes 100 and an electro-hydraulic operation via the first control valve 70. To achieve different variants of operation, primarily the second subassembly 60 has to be modified. The first and the third subassembly 20; 80 can be left unmodified. Therefore high numbers of the first and the third subassembly can be manufactured with low costs.

The first subassembly 20 has a first and second brake pressure connection 24; 26, which is connected to a corresponding brake 100 respectively. The brake 100 may be a disc brake or a drum bake. Multiple brakes may be connected to each brake pressure connection 24; 26 in parallel. Both brakes 100 are operated by one actuation element 82 in parallel to have two independent brake circuits to improve safety. With all embodiments of the disclosure there is a purely mechanical coupling between the actuation element 82 and the first and the second spool 41; 51 if the third subassembly 80 is present. So even if the electro-hydraulic actuation fails the brake system can be operated safely. The actuation element 82 is part of the third subassembly 80.

Furthermore the first subassembly 20 has a first and a second supply connection 23; 25. These are typically connected to one of two independent pressure sources 101 respectively to improve safety. The pressure sources 101 preferably comprise a hydraulic accumulator respectively. Preferably a system the fill the accumulators is provided, which is not shown in FIG. 1.

The first subassembly 20 has an exhaust connection 22 which is connected to a tank 102. The hydraulic brake assembly 10 is preferably operated with hydraulic oil and not with DOT brake fluid used in motor cars. The hydraulic brake assembly 10 is preferably used in vehicles which have hydraulic working functions and/or a hydraulic traction drive, wherein all a hydraulic functions including the brake share a common pump for hydraulic pressure supply.

The first and the second spool 41; 51 are moveable along a first and a second axis 40; 50 respectively, wherein the first and the second axis 40; 50 is a center axis of the corresponding first or second spool 41; 51. The first and the second axis 40; 50 are in parallel. The first subassembly 20 has a first body 21 which abuts to a second body 61 of the second subassembly 60 with a flat surface which is perpendicular to the first and the second axis 40; 50. The second body 61 limits the movement of the first and the second actuation piston 42; 52 respectively with the named flat surface. The third subassembly 80 has a third body 81 which abuts to the second body 61 with a flat surface which is perpendicular to the first and the second axis 40; 50.

Figure 5:
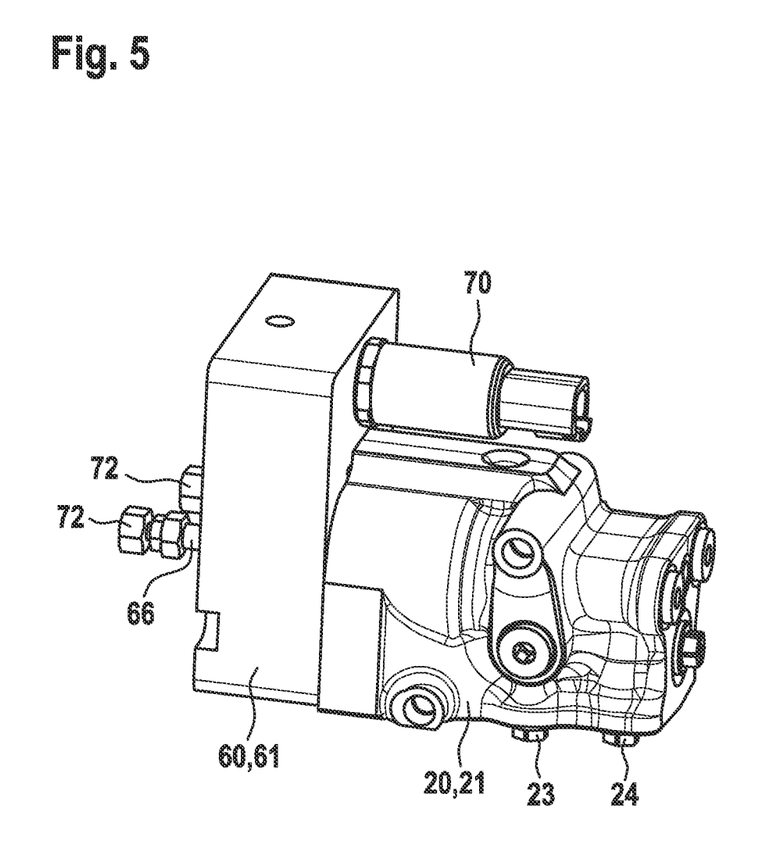
FIG. 5 a perspective view of the first and the second subassembly of FIG. 1.

FIG. 1 shows the first control valve 70 in a symbolic way, wherein the first control valve 70 is actually part of the second subassembly 20 as can be seen from FIG. 5. The first control valve 70 is configured as a pressure reducing valve, which is electrically—9 operated, i.e. the output pressure of the first control valve 70 is proportional or inversely proportional to the current which controls the first control valve 70. The accumulators of the two independent pressure sources are preferable connected to an input side of shuttle valve 103, wherein the corresponding output side is connected to a supply connection of the first control valve 70. The exhaust connection of the first control valve 70 is connected to the tank 102. All tank symbols in FIGS. 1 and 2 depict the same tank 102.

With the first embodiment according to FIG. 1 the first and the second chamber 68; 69 of the second subassembly 60 are connected to the first control valve 70 in parallel so that both chambers 68; 69 have the same pressure. It is possible to have a separate control valve for the first and the second chamber 68; 69 respectively.

Figure 2:
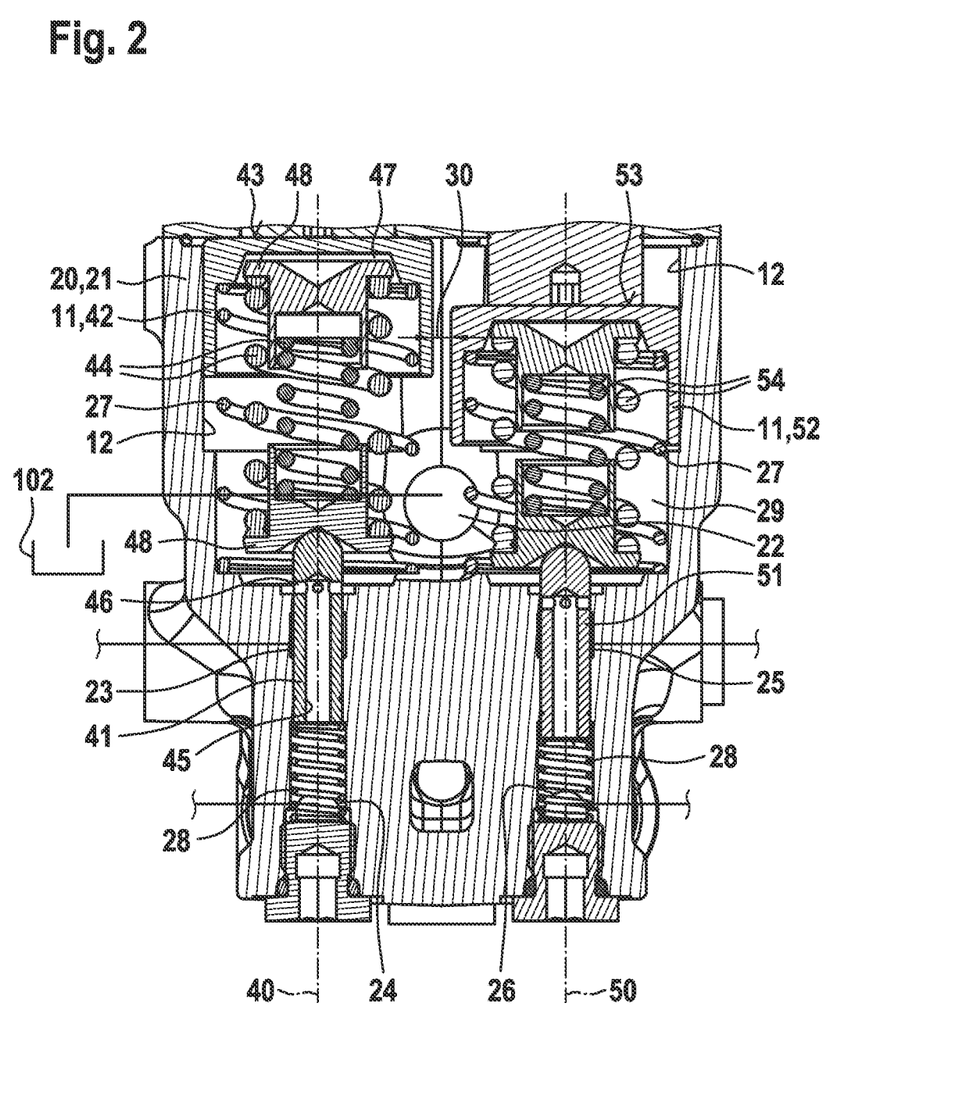
FIG. 2 an enlarged section of FIG. 1 with the first subassembly.

FIG. 2 shows an enlarged section of FIG. 1 with the first subassembly 60. The first subassembly 20 has a first body 21 which encloses the first and the second spool 41; 51; the first and the second actuation piston 42; 52 and the first and the second springs 44; 54 in a fluid tight manner, when the first body 21 is fixed to the second body (no. 61 in FIG. 1). The first and the second spool 41; 51 are part of a pressure reducing valve respectively, wherein both pressure reducing valves are configured identical. In the following only the pressure reducing valve with the first spool 41 is described in detail, wherein the description applies to the other pressure reducing valve with the second spool 51 in the same way.

The first spool 41 is surrounded by a circular groove in the first body 21 which is part of the first supply connection 23 and which is connected to high pressure. Within the first spool 41 there is a first bore 45 which is concentric to the first axis 40, wherein it is only open to the end of the first spool 41 which points away from the first actuation piston 42. The first bore 45 holds the output pressure of the pressure reducing valve. This pressure is connected the a corresponding brake via the first brake pressure connection 24, which comprises a bore in the first body 21 which is perpendicular to the drawing plane of FIG. 2. The named output pressure urges the first spool 41 upward to the first actuation piston 42. A fourth spring 28 urges the first spool 41 in the same direction, wherein this force is primarily relevant when the system has no pressure to bring the first spool 41 in a defined position.

In the opposite direction the first actuation piston 42 is coupled to the first spool 41 via at least one first spring 44. In the embodiment according to FIG. 2 two concentric first springs 44 are used. The outer first spring 44 makes nearly permanent contact with the first actuation piston 42 and the first spool 41. The inner second spring 44 comes in when the outer first spring is compressed some way. Therefore the two first springs 44 in sum have a non-linear relationship between travel and force to improve fine control of low braking forces.

The first spool 41 has four radial second bores 46 which merge into the first bore 45 respectively. In the position of the first spool 41 shown in FIG. 2 the second bores 46 are connected to an exhaust chamber 29, which is connected to a tank via the exhaust connection 22. This connection opens when the output pressure is too high, so that the output pressure lowers.

When the output pressure is too low the first spool 41 moves downward in FIG. 1, so that the second bores 46 are connected to the first supply connection 23 which bears high pressure, wherein the output pressure increases. In consequence the output pressure is proportional to the force of the first springs 44 acting on the first spool 41. This force depends on the position of the first actuation piston 42.

The first actuation piston 42 has a first contact surface 43 which is flat and perpendicular to the first axis 40. The first contact surface 43 most of the times contacts a third contact surface (no. 64 in FIG. 3) of the third actuation piston in the second subassembly. The first actuation piston 42 has a cylindrical portion 11 which defines the first contact surface 43 and whose diameter is larger than the diameter of corresponding cylindrical portion of the third actuation piston. In consequence the second body (no. 61 in FIG. 1) limits the movement of the first actuation piston 42. The first actuation piston 42 is urged against the second body by a third spring 27. In the upmost position of the first actuation piston 42 there is a small gap 47 between the spring plate 48 of the first springs 44 and the first actuation piston 42. Therefore the actuation element (no. 82 in FIG. 1) has to be depressed a little bit to generate a brake pressure which is different from the tank pressure.

The exhaust chamber 29 is delimited by the first and the second body 21; 61 and the first and the second spool 41; 51 and in a fluid tight manner. The first and the second actuation piston 42; 52 are surrounded by the pressure in exhaust chamber from all sides. Especially there is a recess 30 in the first body 21 between the first and the second actuation piston 42; 52. Via this recess leakage from the second subassembly can flow to the exhaust chamber 29. The first and the second actuation piston 42; 52 are guided by a cylindrical bore respectively, which partially surrounds the respective cylindrical portion 11, to allow for the recess 30.

Figure 3:
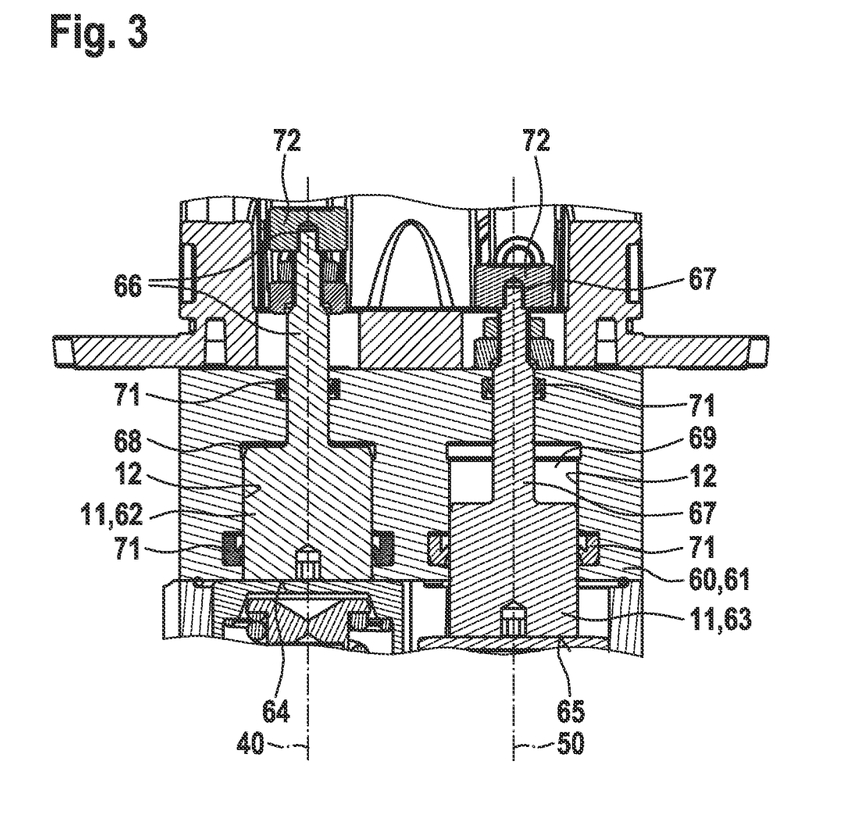
FIG. 3 an enlarged section of FIG. 1 with the second subassembly.

FIG. 3 show an enlarged section of FIG. 1 with the second subassembly 60. The second subassembly 60 comprises a second body 61, which accommodates the third and the second actuation piston 62; 63 which are configured identical. In the following only the third actuation piston 62 is described in detail, wherein the description applies to the fourth actuation piston 63 in the same way.

The third actuation piston 62 has a cylindrical portion 11 and a first actuation section 66, wherein the diameter of the first actuation section 66 is smaller than the diameter of the cylindrical portion 11. The second body 61 is adapted to the third actuation piston 62 in a fluid tight manner. Especially sealing rings 71 are provided to seal the first chamber 12 delimited by the first body 61 and the third actuation piston 62. The volume of the first chamber 68 increases, when the third actuation piston 62 is moved downward to increase the breaking pressure. Somewhat below the upmost position of the third actuation piston 62, the third contact surface 64 is flush with the adjacent flat surface of the second body 61.

In every position of the third actuation piston 62 the first actuation section 66 protrudes out of the second body 61. To increase the area of the top end of first actuation section 66 a separate head part 72 is fixed to the remaining part of first actuation section 66 which is one piece with the cylindrical section 11.

The first axis 40 is a center axis of the first actuation piston 62.

Figure 4:
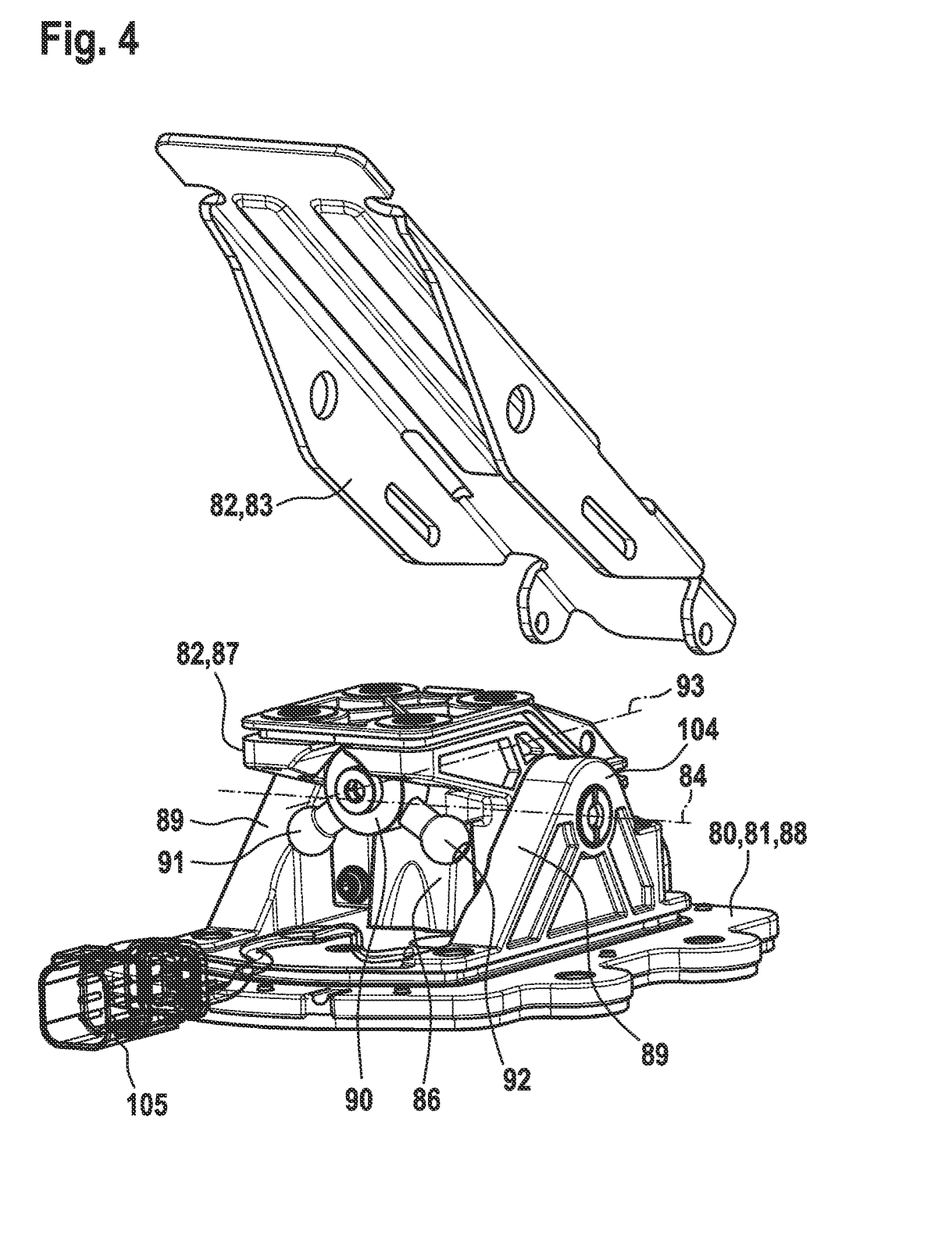
FIG. 4 a perspective, exploded view of the third subassembly of FIG. 1.

FIG. 4 shows a perspective, exploded view of the third subassembly 80 of FIG. 1. The third body 81 is U-shaped with a base plate 88 and two U-legs 89. The U-legs 89 are penetrated by a cylindrical pin 104 which defines the fourth axis 84 which is the swivel axis of the actuation element 82. The actuation element 82 comprises a pedal base 87 and a separate pedal plate 83. The pedal base 87 is located between the U-legs 89, wherein the pin 104 penetrates through the pedal base 87 to form a swivel bearing. The pedal plate 83 is fixed to the pedal base 87. There may be different variants of the pedal plate 87 which are adapted to different mounting positions of the brake actuation assembly in the corresponding vehicle. The pedal plate 87 is shown in an exploded way in FIG. 4 to improve the visibility of the other parts, which are shown non-exploded.

At the front side of the pedal base 87 there is a rocker 90, which is tiltable with respect to a third axis 93. The third axis 93 is perpendicular to the fourth axis 84, wherein it is located between the first and the second axis (no. 40; 50 in FIG. 1). The rocker 90 has a first and a second free end 91; 92 which are located on opposite sides of the third axis 93. The first and the second free end 91; 92 are formed by a ball, preferably made of steel. The named ball is able to contact the head part (no. 72 in FIG. 3) of the corresponding third or fourth actuation piston. In consequence the actuation element 82 can act on the first and the second spool (no. 41; 51 in FIG. 1) with nearly equal forces, even if there is some movement of the first or the second spool due the brake pressure regulation.

Between the U-legs 89 there is a senor 86 which detects the swivel angle of the actuation element 82. Preferably the sensor makes use of the Hall effect. The plug 105 is electrically connected to the sensor 86.

FIG. 5 shows a perspective view of the first and the second subassembly 20; 60 of FIG. 1. The first supply connection 23 and the first brake pressure connection 24 is open to the outside of the first body 21, wherein in FIG. 5 a corresponding plug is visible which prevents entry of dust, when the hydraulic brake actuation assembly is not mounted in its final position at the vehicle.

The first control valve 70 is configured as a cartridge valve which is preferably screwed into the second body 61. The shuttle valve (no. 103 in FIG. 1) is preferably integrated into the second body 61. The location of the first control valve 70 on the second body 61 may be selected differently with different variants of the second subassembly 60.

Figure 6:
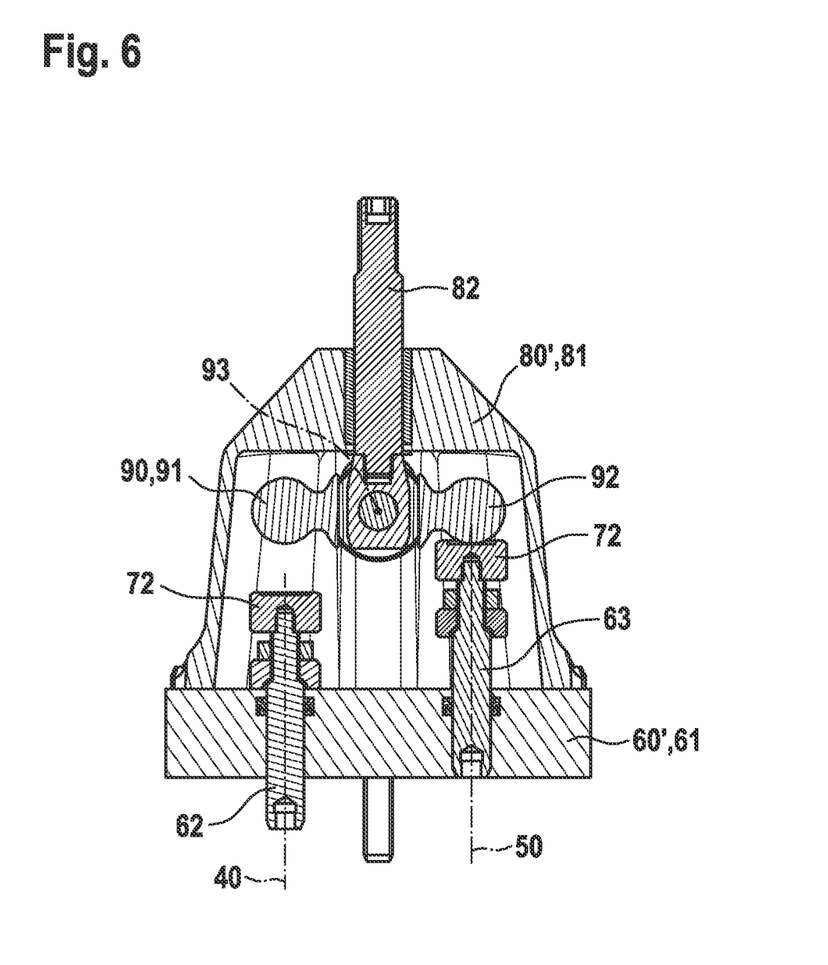
FIG. 6 a sectional view of a second and a third subassembly according to a second embodiment of the disclosure.

FIG. 6 shows a sectional view of a second and a third subassembly 60'; 80' according to a second embodiment of the disclosure. The first subassembly according to FIG. 1 can be mounted to the assembly shown in FIG. 6, wherein no modification of the first subassembly is necessary. It is possible to exchange the third subassembly from FIG. 1 with the third subassembly 80' from FIG. 6, wherein no modification on any named subassembly is necessary. It is possible to exchange the second subassembly from FIG. 1 with the second subassembly 60' from FIG. 6, wherein no modification on any named subassembly is necessary. Therefore it is possible to provide four variants of the hydraulic brake assembly with the subassemblies shown in FIGS. 1 and 6.

FIG. 6 shows a very simple variant of the second subassembly 60', wherein the third and the fourth actuation pistons 62; 63 are formed as a cylindrical pins, which are provided with a head part 72, which is identical to the head part of FIG. 3. With this variant only a mechanical actuation of the brake is possible. An electro-hydraulic actuation is no possible. It would be possible to achieve the same function by modifying the first subassembly and leaving out the second subassembly completely. But with the inventive design the embodiment according to FIG. 6 is more cost effective because the very complex first subassembly can be used for a great number of different variants without modification. Only the simple second subassembly has to be modified.

The second embodiment of the third subassembly 80' is primarily intended for hand operation. The corresponding actuation element 82 is linearly movable relative to the third body 81 parallel to the first and second axis 40; 50. It protrudes out of the third body 81, wherein its free end may be equipped with a separate part, which is ergonomically adapted for hand operation. The third body 81 is cup shaped, wherein its open end is fixed to the second body 61 via screws (not shown).

The rocker 90 is formed analogous to the first embodiment according to FIG. 4. It is tiltable with respect to a third axis 93 which is perpendicular to the first and second axis 40; 50 and located between them. It has a first and a second free end 91; 92 which are located on opposite sides of the third axis 93 and which are ball shaped.

REFERENCE NUMERALS 10 hydraulic brake actuation assembly
11 cylindrical portion
12 bore
20 first subassembly
21 first body
22 exhaust connection
23 first supply connection
24 first brake pressure connection
25 second supply connection
26 second brake pressure connection
27 third spring
28 fourth spring
29 exhaust chamber
30 recess
40 first axis
41 first spool
42 first actuation piston
43 first contact surface
44 first spring
45 first bore
46 second bore
47 gap
48 spring plate
50 second axis
51 second spool
52 second actuation piston
53 second contact surface
54 second spring
60 second subassembly (first embodiment)
60' second subassembly (second embodiment)
61 second body
62 third actuation piston
63 fourth actuation piston
64 third contact surface
65 fourth contact surface
66 first actuation section
67 second actuation section
68 first chamber
69 second chamber
70 first control valve
71 sealing ring
72 head part
80 third subassembly (first embodiment)
80' third subassembly (second embodiment)
81 third body
82 actuation element
83 pedal plate
84 fourth axis
85 pin
86 sensor
87 pedal base
88 base plate
89 U-legs
90 rocker
91 first free end
92 second free end
93 third axis
100 brake
101 pressure source
102 tank
103 shuttle valve
104 pin
105 plug

What is claimed is:

1. A hydraulic brake actuation assembly with a first and a second spool, comprising:
a first subassembly and a second subassembly which are configured to be mounted to each other in a pre-assembled manner,
wherein the first subassembly comprises the first spool and a first actuation piston which are moveable along a first axis respectively,
wherein at least one first spring is located between the first spool and the first actuation piston along the first axis,
wherein the first subassembly comprises the second spool and a second actuation piston which are moveable along a second axis respectively,
wherein at least one second spring is located between the second spool and the second actuation piston along the second axis,
wherein the first axis and the second axis are parallel to each other,
wherein the second subassembly comprises a third actuation piston and a fourth actuation piston,
wherein the third actuation piston is moveable along the first axis,
wherein the third actuation piston has a third contact surface which is configured to contact a first contact surface of the first actuation piston,
wherein the fourth actuation piston is moveable along the second axis, and
wherein the fourth actuation piston has a fourth contact surface which is configured to contact a second contact surface of the second actuation piston.

2. The hydraulic brake actuation assembly according to claim 1, wherein:
the second subassembly has a second body which accommodates the third actuation piston and the fourth actuation piston,
the second body is fixed to a first body of the first subassembly,
the first body accommodates the first spool and the second spool, the first actuation piston and the second actuation piston and the at least one first spring and the at least one second spring,
a diameter of the third actuation piston at the third contact surface is smaller than a diameter of the first actuation piston at the first contact surface,
the second body is configured to limit a movement of the first actuation piston along the first axis and/or a diameter of the fourth actuation piston at the fourth contact surface is smaller than a diameter of the second actuation piston at the second contact surface, and
the second body is configured to limit a movement of the second actuation piston along the second axis.

3. The hydraulic brake actuation assembly according to claim 2, wherein:
a recess is defined in the first body that is located between the first and the second actuation piston,
the recess is covered by the second body, and
the recess is arranged in a way to allow leakage from the third actuation piston and/or the fourth actuation piston to flow into an exhaust chamber of the first body.

4. The hydraulic brake actuation assembly according to claim 2, wherein:

the third actuation piston together with the second body delimits a first chamber, the volume of the first chamber increases when the third actuation piston is moved toward the first spool and/or the fourth actuation piston together with the second body delimits a second chamber, the volume of the second chamber increases when the fourth actuation piston is moved toward the second spool, and the second subassembly comprises at least one control valve which is fluidically connected to the first chamber and/or the second chamber.

5. The hydraulic brake actuation assembly according to claim 4, wherein:

the first spool and the second spool have a separate pressure source, and the at least one control valve is connected to the at least one pressure source for pressure supply.

6. The hydraulic brake actuation assembly according to claim 1, wherein:

the hydraulic brake actuation assembly comprises a moveable actuation element configured to operate the first spool and the second spool in parallel, the hydraulic brake assembly further comprises a third subassembly which is configured to be mounted to the second subassembly in a preassembled manner, the third subassembly comprises the actuation element, and the actuation element is configured to contact the third actuation piston and the fourth actuation piston in parallel.

7. The hydraulic brake actuation assembly according to claim 6, wherein:

the third actuation piston has a first actuation section which protrudes out of a second body of the second subassembly in every position of the third actuation piston, the actuation element is configured to contact the third actuation piston at the first actuation section and/or the fourth actuation piston has a second actuation section which protrudes out of the second body in every position of the fourth actuation piston, and the actuation element is configured to contact the fourth actuation piston at the second actuation section.

8. The hydraulic brake actuation assembly according to claim 7, wherein:

the third subassembly has a third body which is fixed to the second body, the actuation element is movably mounted to the third body, a rocker is mounted pivotably to the remaining actuation element with respect to a third axis, the rocker has a first free end and a second free end which are located on opposite sides of the third axis, the first free end is configured to contact the first actuation section, and the second free end is configured to contact the second actuation section.

9. The hydraulic brake actuation assembly according to claim 8, wherein:

the actuation element is a pedal which is pivotably mounted to the third body with respect to a fourth axis, the fourth axis is perpendicular to the first axis and the second axis, and the distance from the fourth axis to the first axis and from the fourth axis to the second axis is the same.

10. The hydraulic brake actuation assembly according to claim 7, wherein:

the first actuation section penetrates through the first chamber, and/or the second actuation section penetrates through the second chamber.

11. A collection comprising at least two hydraulic brake actuation assemblies which are configured according to claim 1, wherein:

all first subassemblies of the collection are identical, and the second subassemblies of the collection are different from each other.

* * * * *